June 4, 1968  W. D. ALLISON  3,386,751
VEHICLE VARIABLY INTERCONNECTED SUSPENSION SYSTEM
Filed April 25, 1966
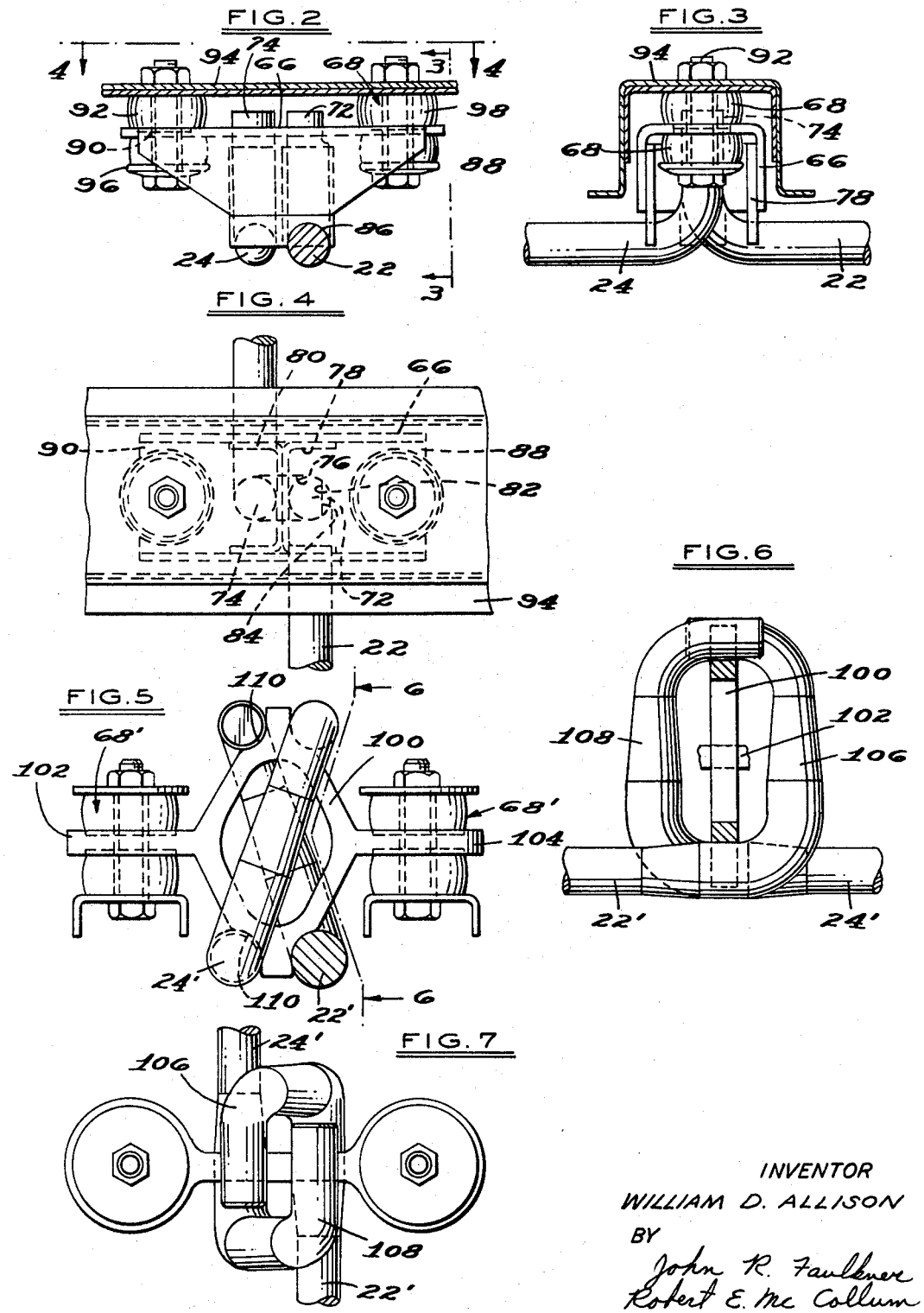
INVENTOR
WILLIAM D. ALLISON
BY
John R. Faulkner
Robert E. McCollum
ATTORNEYS

United States Patent Office 3,386,751
Patented June 4, 1968

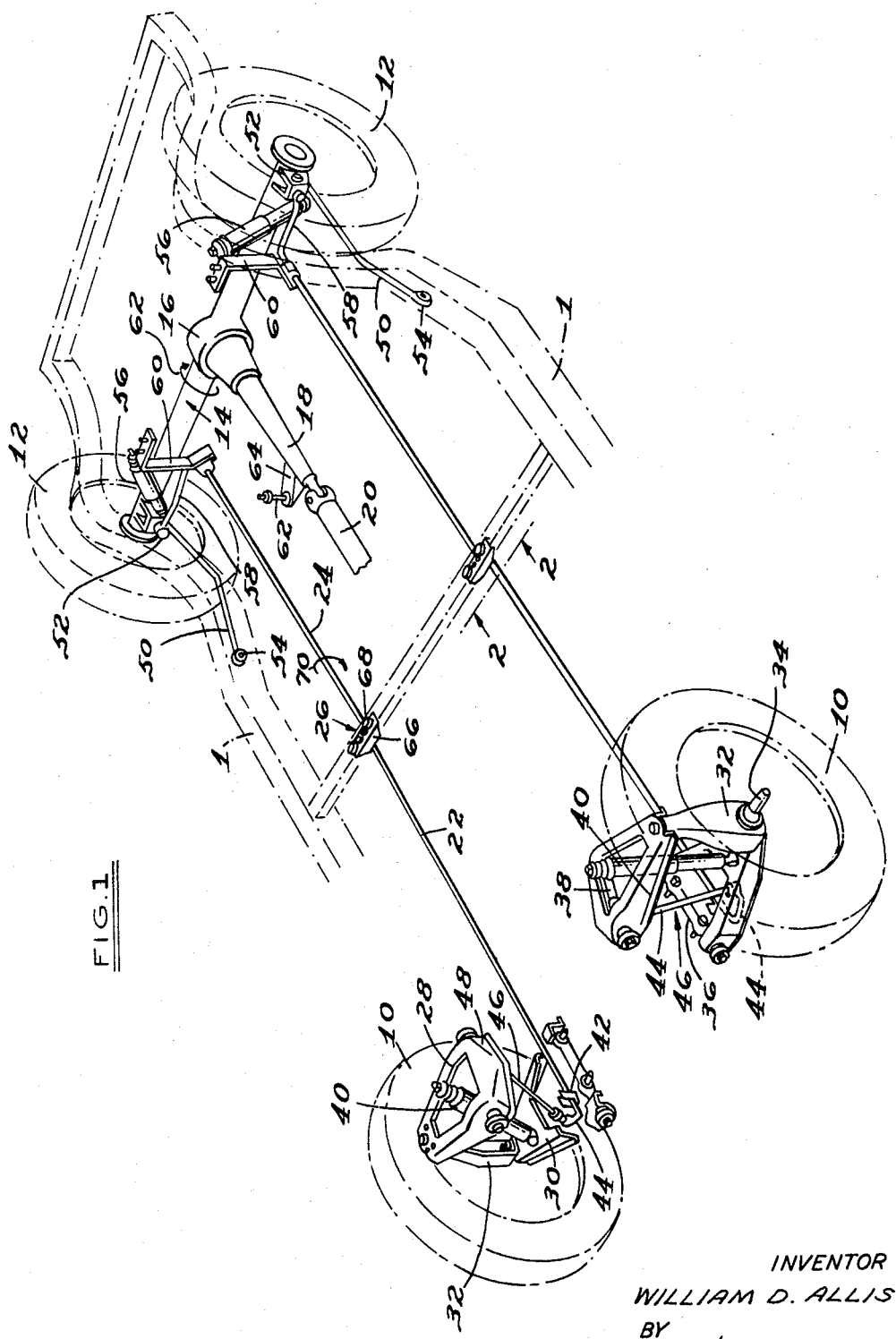

3,386,751
VEHICLE VARIABLY INTERCONNECTED SUSPENSION SYSTEM
William D. Allison, Grosse Pointe Farms, Mich., assignor to Ford Motor Company, Dearborn, Mich., a corporation of Delaware
Filed Apr. 25, 1966, Ser. No. 544,756
21 Claims. (Cl. 280—104)

This invention relates to a motor vehicle spring suspension system. More particularly, it relates to such a system that includes means for interconnecting the front and rear spring systems in a controlled manner.

It is known to provide a motor vehicle with a torsion bar type spring suspension system that includes independently operating, longitudinally extending torsion bars on each side of the vehicle connected, respectively, between the vehicle front and rear wheels and sprung mass. It is also known to provide a controlled interconnection between the front and rear spring systems, or to provide a single torsion bar on each side of the vehicle connecting the front and rear wheel assemblies and sprung mass.

The invention is directed to a spring system of the controlled interconnected type that provides substantial reductions in the effective spring rates in normal ride operation as compared to a conventional mounting of the vehicle frame upon coil or leaf-type springs adjacent each wheel assembly. More specifically, the invention is directed towards an apparatus for connecting the vehicle front and rear spring systems with a variable degree of control to permit either a full interconnection, complete independence between the systems, or a limited interconnection between the two.

It, therefore, is one of the objects of the invention to provide apparatus for variably interconnecting the front and rear wheels of a motor vehicle on each side of the vehicle to a common spring system.

It is another object of the invention to provide a motor vehicle with a spring suspension system that is light in weight, economical to manufacture, and easily assembled to a unitized or other type body.

It is a further object of the invention to provide a motor vehicle interconnected spring system that is reliable in operation, and is readily adjustable to specific installations without altering the basic design objectives.

It is a still further object of the invention to provide a motor vehicle suspension system consisting of a pair of longitudinally extending, essentially end-to-end torsion bars on each side of the vehicle connected at their remote ends to the front and rear wheels of the vehicle and to the vehicle sprung mass, and interconected at their adjacent ends to each other by a mid-anchor lever that is resiliently secured to the vehicle body or sprung mass in a manner to provide a controlled slave movement of the torsion bars relative to each other.

A still further object of the invention is to provide a multi-member connection between two spring members extending essentially in end-to-end relationship with overlapping adjacent end portions; the adjacent end portions being fixed for a controlled movement together upon movement of one of the members; the portion connecting the two members being resiliently, pivotally secured to the vehicle sprung mass or body in a manner such that the degree of reaction provided by the sprung mass and the degree of transmission of torque from one spring member to the other is controllable.

Other objects, features and advantages of the invention will become apparent upon reference to the succeeding, detailed description thereof, and to the drawings illustrating the preferred embodiments thereof; wherein, FIGURE 1 is an isometric view of a motor vehicle suspension system construction according to the invention;

FIGURE 2 is an enlarged cross-sectional view of a detail of FIGURE 1 taken on a plane indicated by and viewed in the direction of the arrows 2—2 of FIGURE 1;

FIGURES 3 and 4 are end and plan views, viewed in the direction of the arrows 3—3 and 4—4, respectively, of FIGURE 2; and, FIGURES 5, 6 and 7 are views corresponding to those shown in FIGURES 2, 3 and 4, and illustrating a modified construction.

FIGURE 1 illustrates, isometrically, an interconnected spring system for a motor vehicle having a sprung mass and an unsprung mass. The sprung mass includes the vehicle frame 1 (indicated by phantom lines) and the body (not shown). The unsprung mass includes front and rear wheels 10 and 12 and their associated brake assemblies, and the live rear axle assembly 14. The latter includes a differential 16 and a torque tube-like pinion shaft extension 18 connected to the rear end of a vehicle driveshaft 20. For clarity, only the rear half of the vehicle frame 1 is shown, the steering components, engine, transmission, and connected driveline portions having been omitted.

The main system for supporting the vehicle frame and body provides a separate spring system on each side of the vehicle. Each system includes a pair of spring members consisting of two torsion bars 22 and 24 extending longitudinally from front to rear and rear to front, respectively, from the associated front and rear wheels 10 and 12. The torsion bars are substantially in end-to-end relationship, as shown, and have a controlled interconnection to each other at their adjacent ends and to the vehicle frame or body by means of a mid-anchor lever 26. This will be described in more detail later. The remote or non-adjacent ends of the torsion bars are connected to the front and rear suspension systems, respectively.

The front suspension includes a separate system for each wheel. Since they are similar, only one will be described. Each system consists of short and long upper and lower wishbone-type suspension arms 28 and 30. The outer ends have ball joint connections to a fabricated wheel support and spindle assembly 32. The inner ends are pivoted by rubber or similar bushings on shafts 36 and 38 that are secured to a front frame cross-member (not shown). The pivot axes for both the upper and lower arms in this case are disposed parallel to the vertical longitudinal mid-plane of the vehicle. Also, the pivot axis of lower arm 30 is parallel to the ground, while the upper arm pivot axis is angled approximately 10° to the rear to resist brake dive forces in a known manner. In this case, the 10° inclination provides approximately 35% cancellation of the brake-diving forces. It will be clear that the degree of inclination and attitude of the members can be changed, as desired, without departing from the scope of the invention. The front suspension also includes a pair of telescopic shock absorbers 40 each pivotally mounted at one end to lower arm 30, as shown, and at its opposite end to a cross-member of the vehicle frame.

The front end of torsion bar 22 has a fulcrum mount in a rolling contact type bearing 42 in which a portion of the round torsion bar rolls on a flat supporting surface, for example. The adjacent end of torsion bar 22 is formed integral with a short substantially right-angled lever arm 44 that is pivotally connected to the lower end of a push rod 46. The upper end of rod 46 is pivotally mounted in an inward extension 48 of upper control arm 28. Both ends of push rod 46 utilize single point of rolling contact type bearings.

The construction described comprises a mechanism for reversing the direction of rotation between upper arm 28 and torsion spring 22; that is, they rotate in opposite directions in response to vertical movement of front wheel 10.

The rear suspension includes a pair of longitudinally extending trailing arms 50. The arms are splayed outwardly and downwardly from a pivotal connection to a bracket 52, fixed on the solid rear axle 14, to a forward pivotal connection 54 at the frame. This locates the axle longitudinally and establishes rear axle understeer during cornering and side movement of the axle relative to the sprung mass, in a known manner. A pair of telescopic shock absorbers 56 are pivotally secured at one end to bracket 52 and at the opposite end to the vehicle frame.

Each of the torsion bars 24, at their rear ends, is bent outwardly or formed integral with a right-angled lever arm 58 that is pivotally connected to bracket 52 by rubber or other suitable bushings. The end portion of each torsion bar 24 adjacent the bend is mounted for rotation through a rubber or other suitable bearing on a spring hanger member 60. The hanger is fixed to the frame cross-member, and transmits the vertical loads from the torsion bar spring to the vehicle body. The hangers also together provide a resilient lateral connection between the body and rear axle that reduces the harshness and shake resulting from sideways push in response to single wheel elevational changes.

Shock absorbers 56 are shown installed in a sea-leg manner to damp out possible resonance of the axle in a transverse plane against the lateral spring rate of hangers 60.

The rear suspension also includes a vertical link 62 that is connected at its upper end to the frame cross-member. At its lower end, it is connected to a set-off bracket 64 that is rigidly secured to rear axle pinion shaft housing extension 18. The link is offset to the right side of extension 18 to increase the vertical load on the right rear wheel 12 during acceleration of the vehicle, and creates a torque reaction on the vehicle body in opposition to that of the motor mounts. The link 62 exerts a vertical force on the rear body portion in opposition to the transfer of weight from front to rear during acceleration of the vehicle, and therefore tends to maintain the body in a more level position at this time. The specific location of link 62 from the rear axle and the location of trailing arms 50 outwardly on axle 14 is chosen to provide essentially parallel lift of the vehicle sprung mass on acceleration, which provides an added forward traction potential and, therefore, very high acceleration potential.

As stated previously, the two torsion bars 22 and 24 on each side of the vehicle are connected by a mid-anchor lever 26 to the sprung mass of the vehicle. In one embodiment, in general, mid-anchor lever 26 consists of a transversely disposed, inverted channel member 66 through which upwardly bent end portions of torsion bars 22 and 24 fixedly extend. The outer lateral edges of channel member 66 each are resiliently connected to the underside of the vehicle body or frame by a pair of rubber cushions 68 that straddle mount the edges. The cushions space the channel member from the frame so that each edge can act as a fulcrum for pivotal movements of the channel member and an angular movement of the bent ends of the torsion bars. The rubber mounts control the degree of interconnection between the torsion bars to thereby control the transmittal of torque from one rod to the other.

As thus far described, the interconnected spring system operates as follows. Upon vertical movement of either rear wheel 12 in jounce, the connected torsion bar lever arm 58 moves upwardly twisting torsion bar 24 in the clockwise direction indicated by arrow 70. This pivots mid-anchor lever 26 about its inner edge connection to the frame to slightly raise the frame and angularly move the ends of torsion rods 24 and 22. This transmits a clockwise torque to front arm 44 of bar 22, an upward movement tendency to push rod 46, and a counterclockwise pivotal effort by upper suspension arm 28. The resultant reaction from front wheel 10 raises the front end of the vehicle frame to about the same degree as the frame was raised at the rear. A similar level raising of the front and rear portions of the vehicle frame occurs during jounce movement of front wheel 10. The pivotal movement of mid-anchor lever 26 about its opposite outer edge again raises one side of the frame as a whole.

Rebound movement of either wheel, of course, causes a corresponding unitary level lowering of one side of the frame. The over-all result is that any independent movement of the front or rear wheels in jounce or rebound causes the vehicle body or frame on that side of the vehicle to move as an entirety in an attempt to maintain that side level with the ground. A similar action occurs during simultaneous movement of both wheels in the same or opposite directions to resist tilting forces. Further details of construction and operation of the spring suspension system beyond that directed to the mid-anchor lever 26 are not given since they are believed to be unnecessary for an understanding of the invention.

FIGURE 2 shows the specific details of construction of one embodiment of the interconnection between torsion bars 22 and 24 and the sprung mass of the vehicle. The adjacent ends 72 and 74 of the two torsion bars 22 and 24 are bent vertically upwardly at right angles to their longitudinal axes, and extend through an elongated slot or aperture 76 provided in the inverted channel-shaped member 66. The end portions of the bars are separated by back-to-back channel-shaped stiffeners 78 and 80 welded or otherwise fixed in member 66. One edge of slot 76 has a squared portion 82 that cooperates with a flat 84 on portion 72 of bar 22, for example, to maintain a right angled relationship between the longitudinal axes of the bars and member 66. Appropriate arcuate guide slots 86 are provided in the lower portions of stiffeners 78 and 80 for passage therethrough of the torsion bars.

The outer lateral edges 88 and 90 of member 66 are suitably apertured, as shown, to receive bolts 92 or other connections for securing member 66 to a portion 94 of the vehicle body. Each of the edges is straddled by the pair of rubber or other resilient cushions 68 that variably space the edges from the body. Suitable spherical washers 96 facilitate slight relative movement of the cushions with respect to the connecting bolts.

In operation, application of torque to one of the bars, for example, bar 22, in a counterclockwise direction (FIGURE 2) pivots member 66 in a similar direction about its left edge 90 as a fulcrum, which is permitted by the compressibility of the opposite upper rubber cushion 98. The resisitance offered by cushion 98, acting through the body, of course, will determine the amount of torque transmitted to bar 24, since the angular movement of member 66 causes an angular rotation of the end 74 of torsion bar 24, but to a lesser extent. What rotation is imparted to rod 24, as best seen in FIGURE 1, is resisted by the front wheel 10, resulting in a slight rise, if any, of the vehicle frame or body on that side, in the manner previously described. A corresponding movement, of course, would occur during a rotation of torsion bar 22 in the opposite direction, upon jounce movement of the front wheel with the rear wheel remaining in the normal position shown in FIGURE 1. That is, member 66 would pivot about its right edge 88 as a fulcrum, and angularly rotate rods 24 and 22 to again raise the frame portion.

From the above, therefore, it will be seen that there is a controlled interconnection between front and rear torsion bars 22 and 24 on each side of the vehicle due to the resilient mounting of mid-anchor lever member 66 at spaced lateral edges upon frame 94 by means of the straddle-mounted cushions 68.

It is to be noted, of course, that the degree of interconnection can be controlled, as desired, simply by controlling the manner in which member 66 is connected to the sprung mass. For example, if essentially full interconnection between torsion bars 22 and 24 is desired, then only a single edge of member 66 would be connected to the frame by a single set of cushions 68 so that the mid-anchor lever always pivots about one edge without transmitting any significant torque to the frame. Alternately, if no interconnection between the torsion bars is desired, member 66 could be rigidly fixed directly to the frame at both edges without the use of either pair of rubber cushions 68.

An alternate construction of the mid-anchor lever is shown in FIGURES 5, 6 and 7. In this case, the mid-anchor connection includes an essentially diamond-shaped, transversely extending member 100 having lateral extensions 102 and 104 connected to the frame cross-member or underside of the vehicle body, again by a straddle mount of the extensions by rubber cushions 68'. The adjacent ends of torsion bars 22' and 24' each are fabricated to an enlarged diameter, for strength, and bent upwardly at right angles to the respective torsion bar longitudinal axis and at an angle to the vertical, and then bent rearwardly essentially at right angles. The bent portions 106 and 108 extend around diametrically opposite portions of member 100 and bear against arcuate seats 110 to locate the bar ends vertically. The arcuate seats positively maintain member 100 at a right angled relationship to the longitudinal axes of torsion bars 22' and 24'.

The operation of this embodiment of the mid-anchor lever is similar to that described in connection with the FIGURES 2-4 embodiment, and a repetition is therefore believed to be unnecessary. Suffice it to say, however, that the rear torsion bars 24 would be installed initially under a torsional preload; that is, they would have an initial windup through an angle of approximately 60° so as to constantly bear against the arcuate seats 110 with sufficient force to maintain the vehicle sprung mass at the desired height from the ground, and maintain the vertical relationship between the parts and the right-angled relationship to member 90. In this particular instance, the wheels would be limited in rebound movement to say five to six inches, for example; therefore, any unwinding or unloading effect due to rotation of the torsion bar during rebound movement of the wheel would be insufficient to angularly move the torsion bar away from seat 110 on member 100.

The degree of torque transmittal between bars 22' and 24', of course, will depend upon whether both sets of rubber cushions 68' are used to connect member 100 to the frame, or just one, or none. The embodiment shown in FIGURES 5-7 has an advantage over that shown in FIGURES 2-4 in that during installation the longitudinal lengths of the torsion bars are not as critical since with the reversely bent end portions, a small amount of longitudinal adjustment can be accommodated.

From the foregoing, therefore, it will be seen that the invention provides an interconnected spring system that provides a full interconnection, no interconnection, or any degree of interconnection, by a simple adjustment of the connection to the sprung mass.

While the invention has been illustrated in its preferred embodiments in the figures, it will be clear to those skilled in the arts to which the invention pertains that many changes and modifications may be made without departing from the scope of the invention.

What is claimed is:

1. An interconnecting means for controlling the transmittal of torque between the front and rear suspension systems of a motor vehicle having sprung and unsprung masses and a pair of essentially end-to-end longitudinally extending spring members substantially aligned with each other on each side of said vehicle connecting and supporting the vehicle sprung mass from the respective front and rear wheels, comprising, connecting means operably interconnecting the adjacent ends of said members and extending laterally thereof, and other means operably spacing said connecting means from and connecting said connecting means to said sprung mass, said other means including resilient means controlling the distribution of torque transmittal between one of said members and the other of said members and the reaction to said spring mass upon application of torque to said one of said members during movement of its associated wheel in jounce and rebound.

2. An interconnecting means as in claim 1, said spring members being torsion bars, said connecting means extending essentially transversely of the longitudinal axes of said spring members and having an outer edge portion laterally spaced from said members.

3. An interconnecting means as in claim 1, said connecting means extending essentially transversely of the longitudinal axes of said spring members and having opposite outer edge portions laterally spaced outwardly from opposite sides of said members.

4. An interconnecting means as in claim 2, said resilient means including deformable means between said sprung mass and the said outer edge portion of said connecting means, said outer edge portion constituting a fulcrum for a pivotal movement of said connecting means and torsion bars thereabout upon application of torque to said one of said bars, said deformable means permitting movement of said fulcrum upon application of torque to said one bar to vary the reaction offered by said sprung mass and the torque transmittal to said other bar.

5. An interconnecting means as in claim 2, said resilient means including deformable means between said sprung mass and the said outer edge portions of said connecting means, said outer edge portions each constituting a fulcrum for a pivotal movement of said connecting means and torsion bars thereabout upon application of torque to said one of said bars, said deformable means permitting shifting movement of each of said fulcrums upon application of torque to said one bar to vary the reaction offered by said sprung mass and the torque transmittal to said other bar.

6. An interconnecting means as in claim 2, said resilient means comprising a pair of deformable elastic members connected to and straddling an outer edge portion of said connecting means, said other means including means fixedly connecting said elastic members to said sprung mass.

7. An interconnecting means as in claim 3, said members being torsion bars and being disposed essentially in a horizontal plane and having the end portions adjacent extending essentially vertically, said connecting means and end portions having cooperating parts together essentially locking said end portions to said connecting means.

8. An interconnecting means as in claim 3, the adjacent ends of said torsion bars being bent upwardly and reversed in direction to extend in a direction essentially parallel to the general direction of extension of said bars, said bent portions surrounding portions of said connecting means to be essentially interlocked therewith to thereby locate said bent end portions vertically.

9. An interconnecting means as in claim 5, said resilient means comprising a pair of deformable elastic members connected to and straddling an outer edge portion of said connecting means, said other means including means fixedly connecting said elastic members to said sprung mass.

10. An interconnecting means as in claim 7, said locking means comprising apertures in said connecting means receiving the end portions of said bars therein, and locking means between one of said end portions and said connecting means.

11. An interconnecting means as in claim 7, said end portions being disposed in essentially a side-by-side overlapping relationship.

12. An interconnecting means as in claim 8, said connecting means having arcuate seating surfaces cooperating with portions of said bars surrounding said connecting means for vertically and laterally locating said bars.

13. An interconnecting means as in claim 11, including means providing an essentially interlocking relationship between said connecting means and said end portions.

14. An interconnecting means as in claim 12, said connecting means comprising an essentially diamond-shaped member, said bar end portions bearing against diametrically opposite edge portions of said connecting member.

15. An interconnecting means as in claim 13, said connecting means having locating surfaces thereon cooperating with said end portions to fixedly locate said end portions with respect to each other and said connecting means.

16. In subcombination, a multi-member connecting apparatus comprising, a support means, a pair of essentially horizontal, longitudinally extending torsion bars substantially axially aligned having laterally overlapping substantially right angled end portions extending essentially vertically therefrom, and connecting means operably interconnecting said end portions and said support for controlling the transmittal of torque between said bars upon application of torque to one of said bars, said connecting means including other means operably interconnecting said end portions for an arcuate pivotal movement of one upon the arcuate movement of the other, and resiliently deformable means between said other means and said support acting as a torque reaction distribution controlling means for further controlling the transmittal of torque between said bars upon the arcuate pivotal movement of one of said bars.

17. A connecting apparatus as in claim 16, said deformable means including a pair of laterally spaced compressible means each positioned between said support and portions of said other means extending laterally from non-adjacent parts of said end portions.

18. A connecting apparatus as in claim 16, said other means including an essentially channel-shaped bracket extending laterally substantially at right angles to the longitudinal axes of said bars, said bracket having apertures therein fixedly receiving the end portions therein.

19. A connecting apparatus as in claim 18, said deformable means including compressible means secured between laterally extending ends of said bracket and said support to dampen the pivotal movement of said bracket with respect to said support upon application of torque to one or both of said bars.

20. A plural member connecting system, comprising, a pair of rotatable members substantially in end-to-end relationship, the adjacent end portions of said members having means extending fixedly therefrom substantially at right angles thereto, said latter portions laterally overlapping one another, a stationary support, connecting means operably interconnecting said end portion means, and flexible torque reaction control means connecting said connecting means and said support providing a limited interconnection between said members and support and controlling the transmittal of torque applied to one of said members from said one member to the other and to said support upon application of torque to said one member.

21. A suspension system for a motor vehicle having a sprung mass and an unsprung mass, the unsprung mass including front and rear wheels each movable in jounce and rebound, comprising, in combination, a pair of substantially in-line torsion bars together extending longitudinally from front to rear on each side of said vehicle in essentially an end-to-end relationship and having their adjacent inner end portion overlapping, means extending essentially laterally from the front end of one bar and the rear end of the other bar on each side of said vehicle, said latter means being operably connected in spaced relationship to said sprung mass and to said front and rear wheels, respectively, for imparting a torsional rotation to each bar upon movement of its associated wheel through jounce or rebound, and means interconnecting the adjacent inner ends of the said bars to each other and to said sprung mass providing a controlled interconnection between the said bars, said means including means connecting the inner ends of said bars together for a limited angular movement of one upon angular movement of the other, and resilient means resiliently connecting said connecting means to said sprung mass to act as a torque reaction distribution controlling means for further controlling the rotation of one of said bars upon rotation of the other.

References Cited

UNITED STATES PATENTS

| | | | |
|---|---|---|---|
| 1,928,545 | 9/1933 | Rondier | 280—104 |
| 2,099,819 | 11/1937 | Mercier | 280—104 |
| 2,563,261 | 8/1951 | Montrose-Oster | 280—104 |
| 2,825,576 | 4/1958 | Allison | 280—104 |
| 2,835,505 | 5/1958 | Fears | 280—104 |
| 2,859,977 | 11/1958 | De Lorean | 280—104 |
| 2,906,543 | 9/1959 | Polhemus | 280—104 |
| 2,911,231 | 11/1959 | Allison | 280—104 |

BENJAMIN HERSH, *Primary Examiner.*

L. L. MORRIS, *Assistant Examiner.*